(12) United States Patent
Peterson et al.

(10) Patent No.: US 7,717,445 B2
(45) Date of Patent: May 18, 2010

(54) DETACHABLE SIDE STEP ASSEMBLY AND METHOD OF USE

(75) Inventors: Blake Peterson, Farmington Hills, MI (US); Brian Martin, Farmington Hills, MI (US); John Harberts, Farmington Hills, MI (US); Ronald Katt, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 12/043,176

(22) Filed: Mar. 6, 2008

(65) Prior Publication Data

US 2009/0224505 A1 Sep. 10, 2009

(51) Int. Cl.
*B60R 3/00* (2006.01)
(52) U.S. Cl. .................. 280/164.1; 280/166
(58) Field of Classification Search .......... 280/163, 280/164.1, 166; 414/537
See application file for complete search history.

(56) References Cited

U.S. PATENT DOCUMENTS

| | | | |
|---|---|---|---|
| 3,517,791 A * | 6/1970 | Miles .................. 193/41 |
| D297,064 S * | 8/1988 | Ball et al. .................. D34/32 |
| 5,193,829 A | 3/1993 | Holloway et al. |
| 5,211,437 A | 5/1993 | Gerulf |
| 5,425,564 A | 6/1995 | Thayer |
| 5,597,195 A | 1/1997 | Meek |
| 5,926,889 A * | 7/1999 | Riesselmann et al. ........ 14/69.5 |
| 6,119,634 A * | 9/2000 | Myrick ...................... 119/847 |
| 6,158,798 A | 12/2000 | Stedtfeld et al. |
| 6,267,398 B1 * | 7/2001 | Lombard .................... 280/163 |
| 6,520,523 B2 | 2/2003 | Beck |
| 6,575,516 B2 * | 6/2003 | Webber ........................ 296/61 |
| 6,592,135 B2 * | 7/2003 | Hendrix .................... 280/164.1 |
| 7,043,789 B2 * | 5/2006 | Morrish ...................... 14/69.5 |
| 7,179,042 B1 * | 2/2007 | Hartmann et al. ............ 414/537 |
| 7,258,384 B2 * | 8/2007 | Drabik et al. .................. 296/61 |
| 2002/0073935 A1 * | 6/2002 | Graham et al. .............. 119/849 |
| 2002/0163157 A1 | 11/2002 | Beck |
| 2009/0044729 A1 * | 2/2009 | Navarre et al. ................ 108/44 |

* cited by examiner

*Primary Examiner*—S. Joseph Morano
*Assistant Examiner*—John D. Walters
(74) *Attorney, Agent, or Firm*—Young Basile

(57) ABSTRACT

Disclosed herein is a detachable side step assembly for use with a vehicle. The side step assembly comprises a side step with a first elongate section and a second elongate section. Each section has longitudinal edges attached to each other by a plurality of hinges. The side step is pivotal about the hinges into a first position wherein the bottom surface of the first elongate section faces the bottom surface of the second elongate section, and a second position wherein the top surfaces of the first and second elongate sections are planar. The side step is configured for releasable attachment to the vehicle when the side step is in the first position and configured for releasable attachment to a tailgate of the vehicle when the side step is in the second position. Also disclosed are a method of using the side step assembly and a vehicle comprising the same.

21 Claims, 4 Drawing Sheets

DETACHABLE SIDE STEP ASSEMBLY AND METHOD OF USE

FIELD OF THE INVENTION

The present invention relates to the field of vehicle side steps and in particular to the field of vehicle side steps detachable for other uses.

BACKGROUND

Side steps are a standard feature on many trucks and sport utility vehicles, such as pickup trucks, vans, delivery trucks, and four wheel drive vehicles. These vehicles are designed with the frame and body having a relatively high clearance from the ground. This higher clearance allows these vehicles to travel adverse road conditions such as deep snow, muddy and rutted roads and other off-road conditions. This higher clearance increases the height of the passenger compartment. To aid in entering the vehicle, side steps have been installed to the undercarriage of the vehicle to provide an intermediate step between the ground and the floor of the vehicle. Typically, side steps are permanently fastened to the vehicle and cannot easily be removed.

Many of these same vehicles are used to transfer cargo from one place to another. Examples of cargo can include ATVs, motorcycles, snowmobiles, jet skis, heavy boxes and the like. Due to the weight of the cargo and the elevation of the floor of the cargo compartment, much cargo must be loaded into or onto the cargo area with loading ramps. The cargo must then be unloaded from the cargo area also using ramps. However, transporting the ramp decreases the effective cargo space of the vehicle. The ramps also increase the weight of the vehicle. Storing the ramps in the back of an open bed pickup truck, for example, may not be practical due to the likelihood of theft.

SUMMARY

Embodiments of a detachable side step assembly are disclosed herein. One embodiment of a side step assembly for use with a vehicle comprises a side step with a first elongate section and a second elongate section. Each section has a top surface, a bottom surface and longitudinal edges and is attached to each other by at least one hinge along respective longitudinal edges. The side step is pivotal about the at least one hinge into a first position wherein the bottom surface of the first elongate section faces the bottom surface of the second elongate section, and a second position wherein the top surfaces of the first and second elongate sections are planar. The side step is configured for releasable attachment to the vehicle when the side step is in the first position and configured for releasable attachment to a tailgate of the vehicle when the side step is in the second position.

Embodiments of using a detachable side step assembly are also disclosed. One embodiment of a method of using a side step of a vehicle comprises first detaching the side step from a stowed position on the vehicle. The side step comprises a first elongate section and a second elongate section each comprising a top surface, a bottom surface and longitudinal edges. The first and second elongate sections are attached to each other by at least one hinge along respective longitudinal edges. The second step is to extend a reduced width of the side step to an enlarged width of a ramp by positioning the side step from the stowed position wherein the bottom surface of the first elongate section faces the bottom surface of the second elongate section, to a ramp position wherein the top surfaces of the first and second elongate sections are planar. Finally, the method comprises releasably attaching an end of the side step in the ramp position to a tailgate.

Also disclosed is a vehicle comprising a vehicle body, a cargo area within the vehicle body and a side step assembly stowed in a position to assist entry to the vehicle. The side step assembly comprises a side step with a first elongate section and a second elongate section each comprising a top surface, a bottom surface and longitudinal edges. The first and second elongate sections are attached to each other by at least one hinge along respective longitudinal edges. The side step is pivotal about the at least one hinge into a first reduced-width position wherein the bottom surface of the first elongate section faces the bottom surface of the second elongate section, and a second expanded position wherein the top surfaces of the first and second elongate sections are planar. The side step is configured to be releasably stowed on the vehicle when the side step is in the first reduced-width position and configured as a releasably attached ramp on the cargo area of the vehicle when the side step is in the second expanded position.

BRIEF DESCRIPTION OF THE DRAWINGS

The description herein makes reference to the accompanying drawings wherein like reference numerals refer to like parts throughout the several views, and wherein.

DETAILED DESCRIPTION

In the various figures, like reference numbers refer to like parts.

Figure 1:
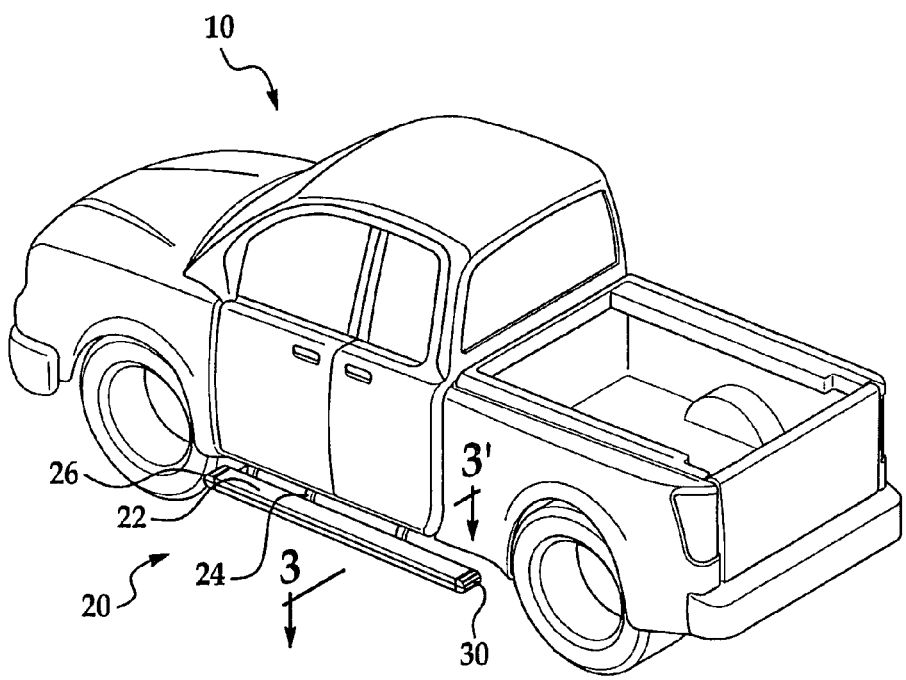
FIG. 1 is a perspective view of a pickup truck with an embodiment of the detachable side step assembly.
Figure 2:
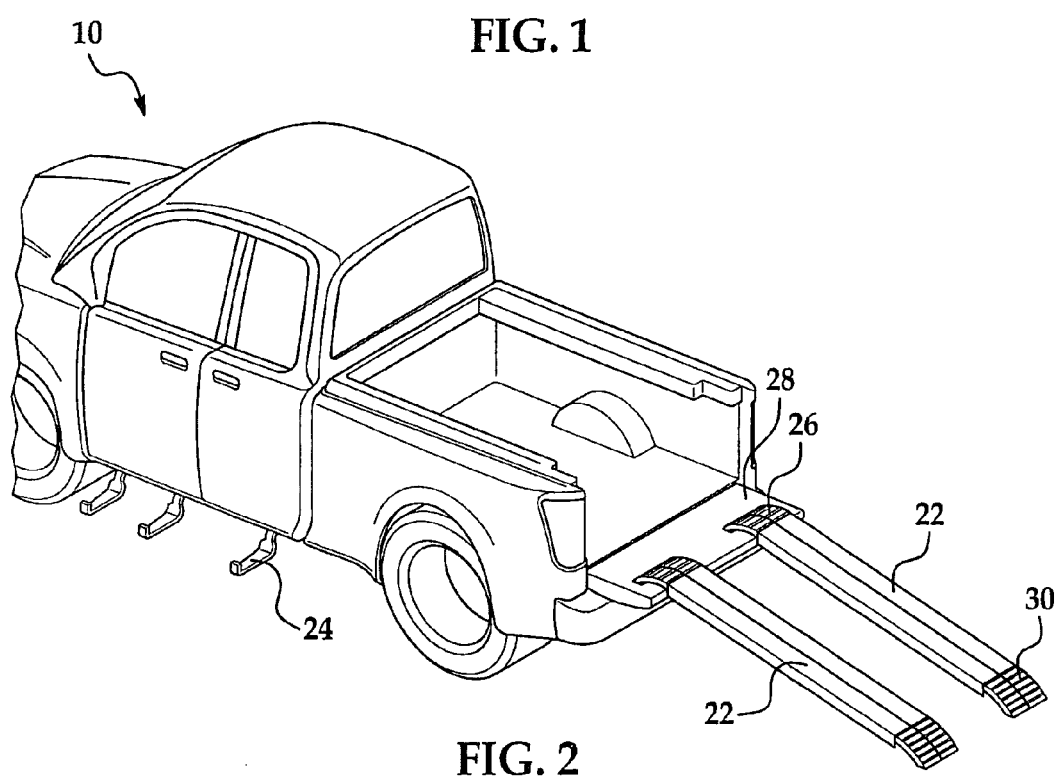
FIG. 2 is a perspective view of a pickup truck utilizing an embodiment of the detachable side step assembly as ramps.

FIGS. 1 and 2 illustrate an example of a vehicle that can incorporate embodiments of the detachable side step assembly disclosed herein. Referring to FIG. 1, a vehicle 10 (in this case, a pickup truck) is shown with an embodiment of the detachable side step assembly 20. Although only one side of the vehicle 10 is shown, it is to be understood that a second detachable side step assembly 20 can be attached to the opposite side of the vehicle 10. The vehicle shown is provided by way of example and not limitation, and other suitable vehicles such as vans, delivery trucks, semi-trucks and sport utility vehicles, can also incorporate the detachable side steps.

The side step assembly 20 in FIGS. 1 and 2 includes a side step 22 shown mounted to the vehicle 10 with three brackets 24. The number and position of the brackets 24 relative to each other is provided by way of example and not limitation. It is contemplated that any number of brackets desired or required can be used to mount the side step to the vehicle. The spacing of the brackets can also be adjusted as desired or required. Further, the overall length of the side step 22 illustrated in FIGS. 1 and 2 is provided by way of example and not limitation. The length of the side step 22 can be any length that allows the side step to assist in entering the vehicle while being long enough to use as loading or off-loading ramps. The side steps 22 can be made from an aluminum extrusion that provides the strength necessary while minimizing weight. However, aluminum extrusion is provided by way of example and not limitation. Other materials can be used as known in the art as desired or required.

FIG. 2 illustrates the side step assembly 20 with the side step 22 detached from the vehicle 10. Transition pieces 26 of the side steps 22 can be seated on the tailgate 28 of the vehicle 10 and inclined such that the transition pieces 30 on the opposite ends of the side steps 22 rests on the ground. The transition pieces 26, 30 are described in more detail below. In this inclined position, the side steps 22 can be utilized as loading or off-loading ramps. It is contemplated that one or both of the side steps can be used at one time depending on the cargo to be loaded. For example, both side steps 22 can be used to load a tractor or other small vehicle with four wheels. Only one side step 22 can be used as a ramp if a person is walking up and down carrying items, or a motorcycle or the like is being loaded or off-loaded. These are provided by way of illustration and are non-limiting examples of the use of the side steps. It is contemplated that the side steps 22 can also be used in other manners. For example, the side step 22 can be used as a bridge to span a space other than that between the tailgate and the ground, such as a creek or mud puddle to provide for foot travel across the creek or puddle.

Figure 3:
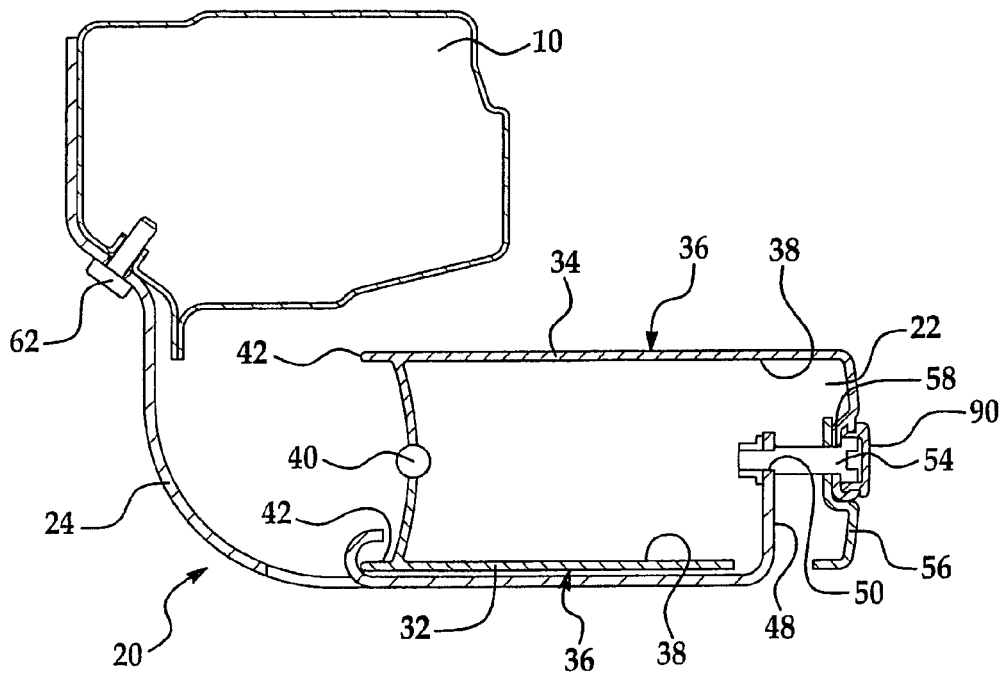
FIG. 3 is a cross-sectional view of the side step assembly embodiment along line 3-3' of FIG. 1.

Referring now to FIG. 3, a cross-sectional view of an embodiment of the side step assembly 20 along line 3-3' of FIG. 1 is illustrated. The side step assembly 20 for use with a vehicle has a side step 22 with a first elongate section 32 and a second elongate section 34 each having a top surface 36 and a bottom surface 38. The first and second elongate sections 32, 34 are attached to each other by a plurality of hinges 40 along respective longitudinal edges 42. The side step 22 can be releasably attached to the vehicle 10 with at least one bracket 24.

The side step 22 is pivotal about the hinges 40 into a first position as shown in FIG. 3. In the first position, the bottom surface 38 of the first elongate section 32 faces the bottom surface 38 of the second elongate section 34. It is in this first folded position that the side step 22 can be releasably attached to the bracket 24. The hinges 40 can be friction hinges. However, friction hinge is provided by way of example and not limitation, and other suitable hinges known in the art can be used.

Figure 4:
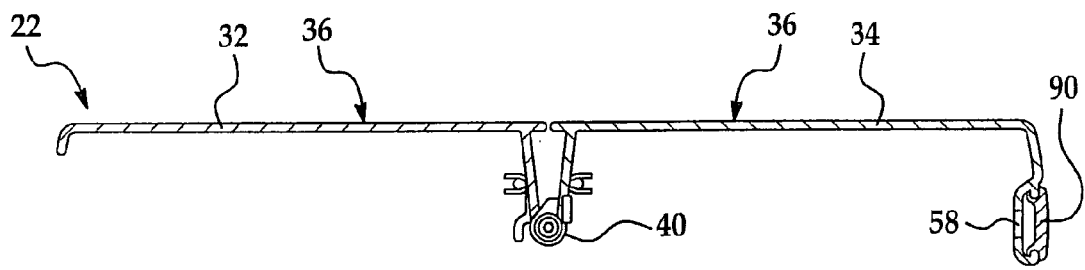
FIG. 4 is a cross-sectional view of the side step in a second position.

A cross-section of the side step 22 in a second position is shown in FIG. 4. In the second position, top surfaces 36 of the first and second elongate sections 32, 34 are unfolded about the hinge 40 until the two top surfaces 36 are planar. As seen in FIG. 4, the side step 22 in the unfolded second position essentially doubles its width. It is in the second position that the side step 22 can be used as a ramp as discussed earlier.

When the side step 22 is in the first position, its width can be sufficiently wide to use as a step, yet narrow enough to maintain proper clearance with the side of the vehicle 10 while also maintaining the vehicle's 10 appearance. Also, the side step 22 does not have to extend beneath the frame of the vehicle 10 due to excessive width, so the clearance from the ground that is obtained with traditional side steps can be maintained. When the side step 22 is in the second position, the side step 22 can be sufficiently wide to safely use it as a ramp for large cargo such as tractors or ATVs. It can also be sufficiently wide to walk up and down. Because of the extended width in this second position, the utility of the ramp function is not affected. The side steps 22 can be more useful as ramps than actual ramps manufactured to be stored in the cargo space of a vehicle, as the weight and size of the manufactured ramps are minimized as much as possible to maintain maximum cargo space.

Figure 5:
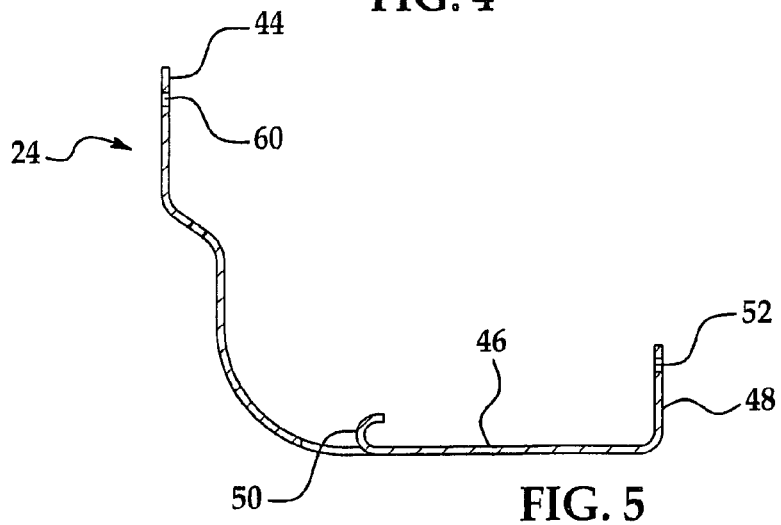
FIG. 5 is a cross sectional view of the bracket of the side step assembly without the side step.

The bracket 24 of the side step assembly 20 will be described in detail with reference to FIG. 5, which depicts a cross-section of the bracket 24. The bracket 24 has a vehicle attachment portion 44 for fixedly attaching the bracket 24 to the vehicle. A carrier portion 46 extends from the vehicle attachment portion 44 to carry the side step. The carrier portion 46 has a flange 48 extending perpendicular to the carrier portion 46 opposite the vehicle attachment portion 44. A catch 50 extends from the carrier portion 46 and is spaced apart from the flange 48. The catch 50 is configured to receive the longitudinal edge 42 of the first elongate section 32 when the side step 22 is in the first folded position and mounted on the carrier portion 46. This configuration is illustrated in FIG. 3.

Referring back to FIG. 3, the flange 48 has a bore 52 configured to receive an attachment fixture 54. The second elongate section 34 of the side step 22 can have a side 56 substantially perpendicular to the bottom surface 38 and opposite the hinged longitudinal edge 42. The side 56 can have at least one bore 58 located so that when the side step 22 is in the first folded position, the one or more bores 58 align with the flange bore 52 of each bracket 24 to receive the attachment fixture 54 through both bores 52, 58. It is contemplated that the first elongate section 32 can also have a side substantially perpendicular to its bottom surface 38 and opposite the hinged longitudinal edge 42. This side can also have at least one bore located so that when the side step 22 is in the first folded position, the one or more bores align with the flange bore 52 of each bracket 24 to receive the attachment fixture 54 through all bores 52, 58 and the additional bore on the side of the first elongate section 32.

The attachment fixture 54 can be a tightening mechanism configured to press the side step 22 against the catch 50 so that the longitudinal edge 42 of the first elongate section 32 is in tight conformity with the catch 50. As the tightening mechanism is tightened, the side 56 of the side step 22 is forced toward the flange 48 of the bracket 24, thereby forcing the longitudinal end 42 of the first elongate section 32 against the catch 50. The tight configuration produced by the tightening mechanism prevents movement of the side step 22 during travel, eliminating rattle and providing a quieter ride. In addition, the catch 50 and carrier portion 46 or part of the carrier portion 56 can be lined with an anti-rattle pad (not shown). The anti-rattle liner can be made from any suitable material known in the art. A non-limiting example of a material suitable for the anti-rattle liner is rubber.

The vehicle attachment portion 44 of the bracket 24 has a bore 60. The bore 60 is sized and configured to accommodate a fastener 62 (shown in FIG. 3) such as a weld or bolt, for fixedly attaching the bracket 24 to the vehicle 10. However, these fasteners are provided by way of example and not limitation, and other suitable fasteners known in the art can be used.

A second embodiment of a side step assembly for use with a vehicle will now be described with reference to FIGS. 6 and 7.

In the second embodiment, the bracket 24 is the same as the bracket 24 of the first embodiment. As such, the description of the bracket 24 will not be repeated. In addition, the tightening mechanism and the anti-rattle liner can be incorporated in the second embodiment as described with the first embodiment, so their descriptions will also not be repeated.

Figure 6:
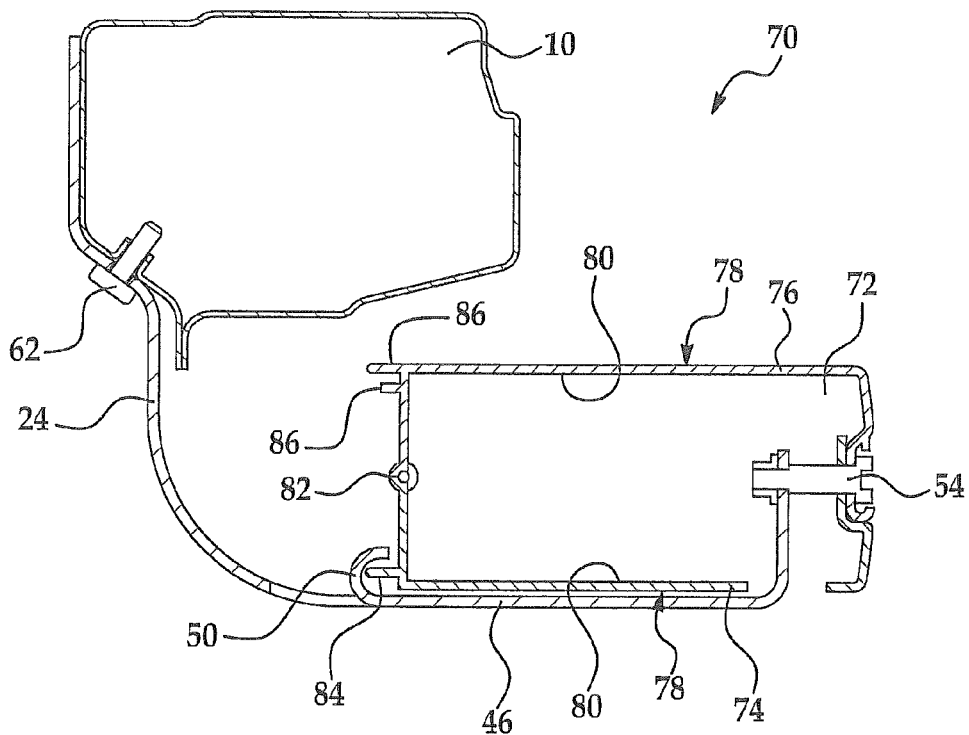
FIG. 6 is a cross-sectional view of another embodiment of the side step assembly.

Referring now to FIG. 6, a cross-sectional view of the second embodiment of the side step assembly 70 is illustrated. The side step assembly 70 for use with a vehicle has a side step 72 with a first elongate section 74 and a second elongate section 76 each having a top surface 78 and a bottom surface 80. The first and second elongate sections 74, 76 are attached to each other by a plurality of hinges 82 along respective longitudinal edges. The hinged longitudinal edge of the first elongate section 74 has a tongue 84 and the hinged longitudinal edge of the second elongate section 76 has a groove 86. The side step 72 can be releasably attached to the vehicle 10 with at least one bracket 24, as in the first embodiment.

The side step 72 is pivotal about the hinges 82 into a first position as shown in FIG. 6. In the first position, the bottom surface 80 of the first elongate section 74 faces the bottom surface 80 of the second elongate section 76. It is in this first folded position that the side step 72 can be releasably attached to the bracket 24.

Figure 7:
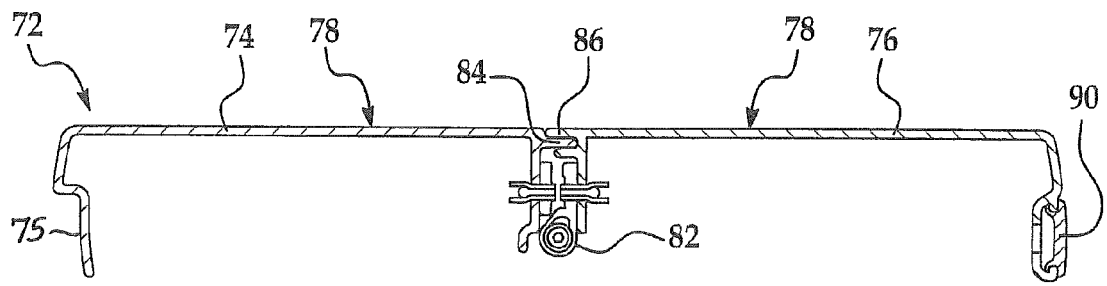
FIG. 7 is a cross-sectional view of the side step of the embodiment in FIG. 6 in a second position.

A cross-section of the side step 72 in a second position is shown in FIG. 7. In the second position, top surfaces 78 of the first and second elongate sections 74, 76 are unfolded about the hinge 82 until the two top surfaces 78 are planar. When the side step 72 is in the second position, the tongue 84 of the first elongate section 74 can be received by the groove 86 of the second elongate section 78, as seen in FIG. 7. The side step 72 in the unfolded second position essentially doubles its width. A distal elongate edge 75 disposed on an opposite side of the bottom surface 80 from the hinged longitudinal edge is also illustrated in FIG. 7. As seen in FIG. 1, the distal elongate edge 75 contacts side 56 when in the first position. It is in the second position that the side step 72 can be used as a ramp as discussed earlier.

In the second embodiment, when the side step 72 is in the first folded position and is mounted on the bracket 24, the tongue 84 of the first elongate section 74 is received by the catch 50 on the carrier portion 46 of the bracket 24. The attachment fixture 54 can be a tightening mechanism as described in the first embodiment. In this embodiment, the tightening mechanism can be configured to press the side step 72 against the catch 50 so that the tongue 84 of the first elongate section 74 is in tight conformity with the catch 50. As with the first embodiment, the tight configuration produced by the tightening mechanism prevents movement of the side step 72 during travel, eliminating rattle and providing a quieter ride. An anti-rattle pad (not shown) can also be used. This configuration is illustrated in FIG. 6.

Alternatively, the hinged longitudinal edge of the first elongate section 74 can have the groove 86 and the hinged longitudinal edge of the second elongate section 76 can have the tongue 84. When the side step 72 is in the first folded position and is mounted on the bracket 24, the groove 86 of the first elongate section 74 is received by the catch 50 on the carrier portion 46 of the bracket 24. The catch 50 can encompass the entire groove 86 or one side of the groove 86 as desired or required. The tightening mechanism can operate as described above with this configuration.

In any of the embodiments of the detachable side step assembly disclosed herein, the first elongate section 32, 74 of the side step 22, 72 can have at least one aperture configured to receive the bracket flange 48 when the side step 22, 72 is in its first position and being mounted onto the bracket 24. The number of apertures can coincide with the number of brackets 24 mounted to the vehicle 10. Each aperture can be sized to receive the flange 48 while also allowing for the slight movement resulting from the tightening mechanism tightening the side step 22 against the catch 50.

In any of the embodiments of the detachable side step assembly disclosed herein, an anti-theft device can be used to prevent unwanted removal of the side steps 22, 72 from the brackets 24. One example of an anti-theft device is a key cylinder with a cover plate 90. The cover plate 90 can be seen in FIGS. 4 through 7. The key cylinder and cover plate configuration can be used on one or more of the attachment fixtures 54 as desired or required. As seen in FIGS. 3 and 6, when the attachment fixture 54 is securing the side step 22, 72 to the bracket 24, the cover plate 90 can be locked in place over the attachment fixture 54 to block access to the attachment fixture 54. When the proper key is placed in the key cylinder (not shown), the cover plate 90 can be unlocked and is movable to reveal the attachment fixture 54.

Another anti-theft device that can be utilized with each embodiment of the detachable side step assembly disclosed herein is a keyed bolt. One or more keyed bolt can be utilized as the attachment fixture 54 or tightening mechanism to secure the side step 22, 72 to the bracket 24. These anti-theft devices are provided by way of example and not limitation. These anti-theft devices can be used alone or in combination. Other suitable means known in the art to prevent the theft of the side steps can also be used.

The transition pieces 26, 30 (shown in FIGS. 1 and 2) of any of the above described embodiments of the side step assembly 20, 70 can be made of the same material as side steps 22, 72 or can be made from other material known to be used in the art. The transition pieces 26, 30 can be configured such that when a side step 22, 72 is in its first position and mounted on the at least one bracket 24, the transition pieces 26, 30 form aesthetically pleasing surfaces at the ends. When the side step 22, 72 is in its second position, the configuration of the transition pieces 26, 30 provide transition surfaces from the side steps 22, 72 to the tailgate 28 and ground when inclined between the two.

Figure 8:
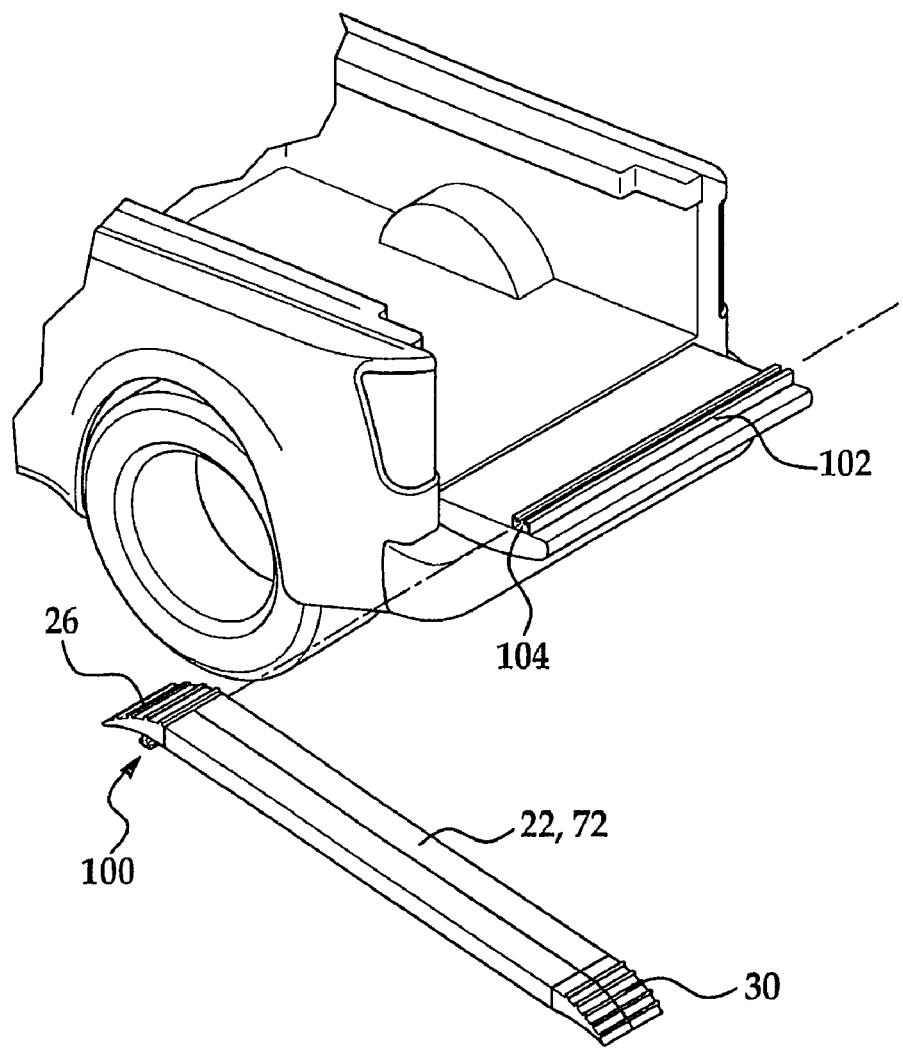
FIG. 8 is a perspective view of the side step assembly in the second position.
Figure 9:
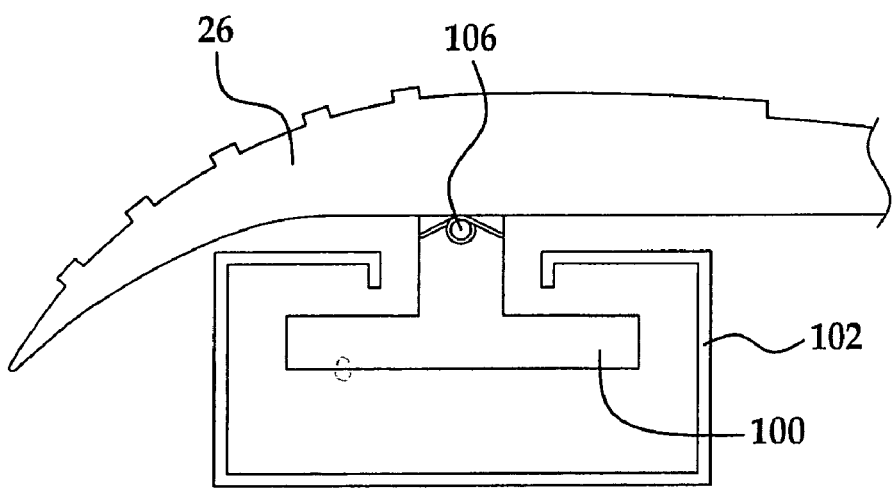
FIG. 9 is an exploded view of a releasable attachment fixture.

In one embodiment of the transition pieces 26, 30 shown in FIGS. 8 and 9, the transition piece 26 can be configured with a protrusion 100. The protrusion 100 can be matingly received by a track 102 located on the tailgate 28. The protrusion can be introduced to the track 102 at an end 104 of the track 102. The protrusion 100 can slide along the track 102 until the transition piece 26 is in the desired or required position. The track 102 can have stops (not shown) to assist in positioning the transition piece 26 in the track 102, and either the track 102 or the protrusion 100 can further have locking mechanisms (not shown) that will lock the protrusion 100 into the track 102 when properly positioned. The protrusion 100 is depicted in FIG. 9 as a T-shaped protrusion, with the track 102 configured to matingly receive the T-shape. This shape is provided by way of example and not limitation, and other suitable configurations known in the art for the protrusion 100 and track 102 can be utilized. As shown in FIG. 9, the protrusion 100 can be attached to the transition piece 26 with a hinge 106 or other equivalent attachment fixture to allow the side step 22, 72 to be positioned at different angles to accommodate different inclines.

The transition pieces 26 of the side step 22, 72 can be seated on the tailgate 28 or attached to the tailgate 28 in any manner well known in the art to prevent the ramps 22, 72 from moving or separating while in use. For example, contact surfaces with slip resistant coatings can be used on a surface of the transitions pieces 26 to prevent sliding when the transition pieces 26 are seated. Non-limiting examples of attachments include safety strapping the transition pieces 26 to the tailgate 28, u-bolting the transition pieces 26 to the tailgate 28 through aligning holes on both the transition pieces 26 and the tailgate 28, fitting an extension from the transition pieces 26 into sockets in the tailgate 28 and the like. It is contemplated that vehicles can be retrofitted with the side steps 22, 72 or vehicles can be manufactured with the side steps 22, 72.

Also disclosed herein is a method of using any one of the embodiments of the side step assemblies with a vehicle. The method comprises detaching the side step from the vehicle, wherein the side step configuration can be that of any of the embodiments disclosed above. The method continues with extending a width of the side step to a width of a ramp by positioning the side step from a step position wherein the bottom surface of the first elongate section faces the bottom surface of the second elongate section, to a ramp position wherein the top surfaces of the first and second elongate sections are planar. An end of the side step can be releasably attached in the ramp position to a tailgate. The side step can comprise a transition piece at its end that releasably attaches to the tailgate while providing a transition surface for loading and unloading. The transition piece can comprise a protrusion that is matingly received by a track on the tailgate.

The method can further comprise releasing the side step from the tailgate after use, repositioning the side step from the ramp position to the step position and then releasably attaching the side step in the step position to the vehicle.

The step of releasably attaching the side step to the vehicle can comprise inserting the longitudinal edge of the first elongate section into the catch of at least one bracket, wherein the bracket is that described in the embodiments above. Next are the steps of coaxially aligning the bore of the at least one bracket with at least one bore matingly positioned on the side step and inserting the attachment fixture into the bores.

The method can further comprise preventing movement of the side step during travel by tightening the attachment fixture, wherein the attachment fixture is a tightening mechanism configured to press the side step in tight relationship with the catch. Additionally, the method can comprise locking the side step to the vehicle after the attachment fixture is inserted into the bores. The locking of the sidestep can comprise using at least one keyed bolt configured to lock the side step to the at least one bracket during released attachment, using at least one key cylinder with a cover plate configured to secure at least one attachment fixture when the side step is attached to the at least one bracket, or using a combination of the at least one keyed bolt and the at least one key cylinder with the cover plate.

Because the method can comprise any embodiment of the side step assembly, the method can further comprise inserting the flange into the aperture while the longitudinal edge is inserted into the catch if an embodiment with apertures is used. If the embodiment comprises the tongue and groove discussed above, extending the side step to the ramp position can comprise inserting the tongue into the groove to form the planar surface.

A vehicle with a detachable side step assembly is also disclosed. The vehicle, as shown in FIG. 1, comprises a vehicle body, a cargo area within the vehicle body and a side step assembly positioned for assisting entry to the vehicle. The side step assembly can be any one of the embodiments of the side step assemblies disclosed herein.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A side step assembly for use with a vehicle comprising:
a side step with a first elongate section and a second elongate section each comprising a top surface, a bottom surface and a side wall extending from each elongate section and having a hinged longitudinal edge, the first and second elongate sections attached to each other by at least one hinge along respective hinged longitudinal edges,
wherein the side step is pivotal about the at least one hinge into a first position wherein the bottom surface of the first elongate section faces the bottom surface of the second elongate section, and a second position wherein the top surfaces of the first and second elongate sections form a planar surface, wherein when the side step is in the first position, the hinge is positioned between the bottom surfaces of the first and second elongate sections and when the side step is in the second position, the hinge is positioned a distance of the side wall below the bottom surfaces of the first and second elongate sections, and
wherein the side step is configured for releasable attachment to the vehicle when the side step is in the first position and configured for releasable attachment to a tailgate of the vehicle when the side step is in the second position.

2. The side step assembly of claim 1, wherein the side step is releasably attached to the vehicle with at least one bracket comprising:
a vehicle attachment portion;
a carrier portion extending from the vehicle attachment portion;
a flange extending perpendicular to the carrier portion opposite the vehicle attachment portion; and
a catch extending from the carrier portion and spaced apart from the flange and configured to receive a longitudinal edge of the first elongate section proximate to the side wall when the side step is in the first position.

3. The side step assembly of claim 2, wherein the flange has a bore configured to receive an attachment fixture and the second elongate section further comprises a side wall opposite the hinged longitudinal edge, the side wall having at least one bore, such that when the side step is in the first position, the side wall of the second elongate section is positioned exterior the flange opposite the vehicle such that the at least one bore coaxially aligns with the bore of the flange of the at least one bracket to receive the attachment fixture.

4. The side step assembly of claim 3, wherein the attachment fixture is a tightening mechanism configured to press the side step tightly against the catch.

5. The side step assembly of claim 2, wherein the first elongate section has at least one aperture positioned such that when the side step is in the first position, the at least one aperture receives the flange of the at least one bracket as the catch receives the hinged longitudinal edge of the first elongate section.

6. The side step assembly of claim 2, wherein the bracket further comprises an anti-rattle pad lining the catch and at least a part of the carrier portion.

7. The side step assembly of claim 1, wherein the side step further comprises a transition piece on at least one end of the side step, the transition piece configured to releasably attach the side step to the tailgate while providing a transition surface from the side step to the tailgate.

8. The side step assembly of claim 7, wherein the transition piece comprises a protrusion and the tailgate comprises a track configured to matingly receive the protrusion, and wherein the track receives the protrusion to releasably attach the side step to the tailgate.

9. A side step assembly for use with a vehicle comprising:
a side step with a first elongate section and a second elongate section each comprising a top surface, a bottom surface and a side wall extending from each elongate section and having a hinged longitudinal edge, the first and second elongate sections attached to each other by at least one hinge along respective hinged longitudinal edges,
wherein the side step is pivotal about the at least one hinge into a first position wherein the bottom surface of the first elongate section faces the bottom surface of the second elongate section, and a second position wherein the top surfaces of the first and second elongate sections form a planar surface, wherein when the side step is in the first position, the hinge is positioned between the bottom surfaces of the first and second elongate sections and when the side step is in the second position, the hinge is positioned a distance of the side wall below the bottom surfaces of the first and second elongate sections,
wherein the side step is configured for releasable attachment to the vehicle when the side step is in the first position and configured for releasable attachment to a tailgate of the vehicle when the side step is in the second position, and
wherein a longitudinal edge of the first elongate section proximate to the side surface has a tongue extending substantially parallel to the first elongate section and a longitudinal edge of the second elongate section has a mating groove extending substantially parallel to the second elongate section such that when the side step is in the second position, the groove receives the tongue.

10. A side step assembly for use with a vehicle comprising:
a side step with a first elongate section and a second elongate section each comprising a top surface, a bottom surface and a side wall having a longitudinal edge, the first and second elongate sections attached to each other by at least one hinge along respective longitudinal edges,
wherein the side step is pivotal about the at least one hinge into a first position wherein the bottom surface of the first elongate section faces the bottom surface of the second elongate section, and a second position wherein the top surfaces of the first and second elongate sections form a planar surface,
wherein the side step is configured for releasable attachment to the vehicle when the side step is in the first position and configured for releasable attachment to a tailgate of the vehicle when the side step is in the second position,
wherein the side step is releasably attached to the vehicle with at least one bracket comprising:
a vehicle attachment portion;
a carrier portion extending from the vehicle attachment portion;
a flange extending perpendicular to the carrier portion opposite the vehicle attachment portion; and
a catch extending from the carrier portion and spaced apart from the flange and configured to receive a longitudinal edge of the first elongate section proximate to the side wall when the side step is in the first position, and
wherein the longitudinal edge of the first elongate section has a tongue extending substantially parallel to the first elongate section and a longitudinal edge of the second elongate section has a mating groove extending substantially parallel to the second elongate section such that when the side step is in the second position, the groove receives the tongue and when the side step is in the first position, the catch receives the tongue.

11. The side step assembly of claim 10 further comprising at least one keyed bolt configured to lock the side step to the at least one bracket during released attachment, at least one key cylinder with a cover plate configured to secure at least one attachment fixture when the side step is attached to the at least one bracket, or a combination of the at least one keyed bolt and at least one key cylinder with the cover plate.

12. A method of using a side step of a vehicle comprising:
detaching the side step from a stowed position on the vehicle, the side step comprising a first elongate section and a second elongate section each comprising a top surface, a bottom surface, a hinged side wall and a distal side wall, the first and second elongate sections attached to each other by at least one hinge along respective longitudinal edges of the hinged side wall, and the distal side walls configured and arranged to overlap each other in the stowed position;
extending a reduced width of the side step to an enlarged width of a ramp by positioning the side step from the stowed position wherein the bottom surface of the first elongate section faces the bottom surface of the second elongate section and the at least one hinge is positioned between the bottom surfaces, to a ramp position wherein the top surfaces of the first and second elongate sections form a planar surface and the at least one hinge is positioned a distance of the hinged side wall below the bottom surfaces; and
releasably attaching an end of the side step in the ramp position to a tailgate.

13. The method of claim 12 further comprising:
releasing the side step from the tailgate after use;
repositioning the side step from the ramp position to the stowed position; and
releasably attaching the side step in the stowed position to the vehicle.

14. The method of claim 13, wherein the side step is releasably attached to the vehicle with at least one bracket comprising:
a vehicle attachment portion fixedly attached to the vehicle;
a cater portion extending from the vehicle attachment portion;
a flange extending perpendicular to the carrier portion opposite the vehicle attachment portion and having a bore configured to receive an attachment fixture; and
a catch on the carrier portion and spaced apart from the flange configured to receive a longitudinal edge of the first elongate section proximate the hinged side wall when the side step is in the first position, and wherein releasably attaching the side step to the vehicle comprises:
inserting the longitudinal edge of the first elongate section proximate the hinged side wall into the catch of the at least one bracket;
coaxially aligning the bore of the at least one bracket with at least one bore matingly positioned on the distal side wall of the second elongate section, the distal side wall on an opposite side of the flange as the vehicle; and inserting the attachment fixture into the bores.

15. The method of claim 14 further comprising:

preventing movement of the side step during travel by tightening the attachment fixture, wherein the attachment fixture is a tightening mechanism configured to press the side step in tight relationship with the catch.

16. The method of claim 14, wherein the first elongate section has at least one aperture positioned such that when the side step is in the first position, the at least one aperture receives the flange of the at least one bracket, the method further comprising inserting the flange into the aperture while the longitudinal edge is inserted into the catch.

17. The method of claim 14 further comprising locking the side step to the vehicle after the attachment fixture is inserted into the bores.

18. The method of claim 17, wherein locking the sidestep comprises using at least one keyed bolt configured to lock the side step to the at least one bracket during released attachment, using at least one key cylinder with a cover plate configured to secure at least one attachment fixture when the side step is attached to the at least one bracket, or using a combination of the at least one keyed bolt and the at least one key cylinder with the cover plate.

19. The method of claim 13, wherein the longitudinal edge of the first elongate section proximate the hinged side wall has a tongue and the longitudinal edge of the second section proximate the hinged side wall has a mating groove, and wherein extending the side step to the ramp position comprises inserting the tongue into the groove to form the planar surface.

20. The method of claim 12, wherein the end of the side step is a transition piece with a protrusion, and the step of releasably attaching the side step to the tailgate comprises sliding the protrusion along a track on the tailgate.

21. A side step assembly for use with a vehicle comprising:

a side step with a first elongate section and a second elongate section each comprising a top surface and a bottom surface and a hinged longitudinal side, the first and second elongate sections attached to each other by at least one hinge along respective hinged longitudinal sides, wherein the side step is pivotal about the at least one hinge into a first position wherein the bottom surface of the first elongate section faces the bottom surface of the second elongate section, and a second position wherein the top surfaces of the first and second elongate sections are planar, wherein when the side step is in the first position, the hinge is positioned between the bottom surfaces of the elongate sections, and wherein the side step is configured for releasable attachment to the vehicle when the side step is in the first position and configured for releasable attachment to a tailgate of the vehicle when the side step is in the second position, wherein the first and second elongate sections each further comprise a distal elongate side opposite the hinged longitudinal side, and wherein when the side step is in the first position the distal elongate side of the first elongate section overlaps with the distal elongate side of the second elongate section.

* * * * *